US008593388B2

(12) United States Patent
Kim et al.

(10) Patent No.: US 8,593,388 B2
(45) Date of Patent: Nov. 26, 2013

(54) LIQUID CRYSTAL DISPLAY DEVICE AND DRIVING METHOD OF THE SAME

(75) Inventors: Jin-Sung Kim, Gumi-si (KR); Ha-Young Ji, Songsan-si (KR)

(73) Assignee: LG Display Co. Ltd., Seoul (KR)

( * ) Notice: Subject to any disclaimer, the term of this patent is extended or adjusted under 35 U.S.C. 154(b) by 1069 days.

(21) Appl. No.: 11/967,967

(22) Filed: Dec. 31, 2007

(65) Prior Publication Data

US 2009/0096769 A1 Apr. 16, 2009

(30) Foreign Application Priority Data

Oct. 10, 2007 (KR) .......................... 10-2007-101794

(51) Int. Cl.
*G09G 3/36* (2006.01)
*G06F 3/038* (2013.01)
*G09G 5/00* (2006.01)

(52) U.S. Cl.
USPC ............................ 345/100; 345/204; 345/208

(58) Field of Classification Search
USPC ........... 345/204, 208–209, 55, 87, 92, 94, 96, 345/100
See application file for complete search history.

(56) References Cited

U.S. PATENT DOCUMENTS

| | | | | |
|---|---|---|---|---|
| 5,576,738 A * | 11/1996 | Anwyl et al. | 345/212 |
| 5,610,667 A * | 3/1997 | Hush | 348/796 |
| 6,538,648 B1 * | 3/2003 | Koike et al. | 345/213 |
| 2003/0011557 A1 * | 1/2003 | Koga et al. | 345/99 |
| 2003/0085860 A1 * | 5/2003 | Baek | 345/87 |
| 2003/0128198 A1 * | 7/2003 | Mizuyabu et al. | 345/204 |
| 2007/0165127 A1 * | 7/2007 | Minami | 348/308 |
| 2008/0129761 A1 * | 6/2008 | Kim et al. | 345/690 |

FOREIGN PATENT DOCUMENTS

| | | |
|---|---|---|
| KR | 1020070080170 A | 8/2007 |
| KR | 1020070080491 A | 8/2007 |

OTHER PUBLICATIONS

Office Action issued in corresponding Korean Patent Application No. 10-2007-0101794, mailed Mar. 11, 2013.

* cited by examiner

*Primary Examiner* — Jonathan Horner
(74) *Attorney, Agent, or Firm* — Brinks Gilson & Lione

(57) ABSTRACT

A liquid crystal display device includes a liquid crystal panel, gate and data drivers providing the liquid crystal panel with gate and data signals, and a timing controller receiving input signals that include an image signal, a sync signal, a data enable signal and a clock signal, wherein the timing controller includes a gate control signal generator controlling the gate driver, a data control signal generator controlling the data driver, a data processor supplying the image signal to the data driver, and a vertical enable signal generator generating a vertical enable signal according to the data enable signal and controlling the gate control signal generator and the data control signal generator.

13 Claims, 4 Drawing Sheets

LIQUID CRYSTAL DISPLAY DEVICE AND DRIVING METHOD OF THE SAME

CLAIM FOR PRIORITY

The present invention claims the benefit of Korean Patent Application No. 10-2007-101794 filed in Korea on Oct. 10, 2007, the entire content of which is hereby incorporated by reference.

BACKGROUND OF THE INVENTION

1. Field of the Invention

The present invention relates to a liquid crystal display device and a driving method of the same, and more particularly, to a timing controller of a driving circuit for an LCD device and a driving method of the same.

2. Discussion of the Related Art

Liquid crystal display (LCD) devices have been widely used for monitors of personal computers or notebook computers, personal digital assistants (PDAs) and wall-mounted televisions because of their thin thickness, light weight and low power consumption.

A related art LCD device will be described in more detail with reference to accompanying drawings.

FIG. 1 is a view of schematically illustrating a related art LCD device. In FIG. 1, the LCD device includes a liquid crystal panel 10 and a driving system 20. The liquid crystal panel 10 displays images, and the driving system 20 generates and provides signals for driving elements of the liquid crystal panel 10.

The liquid crystal panel 10 includes gate lines 12 and data lines 14 that cross each other and define pixel regions. A thin film transistor T, a liquid crystal capacitor $C_{LC}$ and a storage capacitor $C_{ST}$ are disposed in each pixel region. The thin film transistor T is connected to the gate and data lines 12 and 14. The liquid crystal capacitor $C_{LC}$ and the storage capacitor $C_{ST}$ are connected to the thin film transistor T.

The driving system 20 includes a timing controller 22, a gate driver 24 and a data driver 26. RGB data and control signals are input from an external system (not shown) to the timing controller 22. The timing controller 22 re-arranges the RGB data and generates gate control signals and data control signals for controlling the gate driver 24 and the data driver 26, respectively. The timing controller 22 provides the gate driver 24 with the gate control signals and the data driver 26 with the data control signals and the re-arranged RGB data.

The gate driver 24 supplies gate signals $V_G$ to the gate lines 12 of the liquid crystal panel 10 according to the gate control signals from the timing controller 22. The data driver 26 provides data signals $V_{data}$ to the data lines 14 of the liquid crystal panel 10 according to the data control signals and the RGB data from the timing controller 22.

Therefore, the liquid crystal panel 10 displays images in accordance with the gate signals $V_G$ and the data signals $V_{data}$.

The timing controller 22 is connected to the external system through an interface, and the RGB data and the control signals are transmitted through a transistor-transistor logic (TTL) signaling. However, since a large number of transmission paths are necessary to transmit the RGB data and the control signals through the TTL signaling, a large number of cables and connectors are also needed. Accordingly, the transmission paths are more easily exposed to external noises, and the RGB data and the control signals are directly or indirectly influenced by the external noises, whereby images may be abnormally displayed.

To solve such a problem, a low voltage differential signaling (LVDS) has been proposed for the interface. The LVDS is a high-speed digital interface technology, in which two different voltages having opposite polarities are generated and data is transmitted by comparing the voltages. Accordingly, the data can be transmitted at low voltages, and the LVDS has advantages of low power consumption and high transmission speed. In addition, the LVDS is relatively highly resistant to the external noises.

A related art timing controller using the LVDS technology will be described in detail with reference to accompanying drawings.

FIG. 2 and FIG. 3 are views of schematically illustrating a related art timing controller. FIG. 2 shows connections of the timing controller with other systems, and FIG. 3 shows a structure of the timing controller.

In FIG. 2 and FIG. 3, the timing controller 30 includes a LVDS receiver (LVDS Rx) 32 and a logic unit 34.

The LVDS receiver 32 is connected to a LVDS transmitter (LVDS Tx) 40. The LVDS receiver 32 includes a phase locked loop (PLL) 32*a*. The PLL 32*a* keeps phases of output signals and input signals uniform.

The logic unit 34 is connected to gate and data drivers 54 and 56. The logic unit 34 includes a fail safe 34*a*, a gate control signal generator 34*b*, a data control signal generator 34*c* and a data processor 34*d*.

The LVDS transmitter 40 converts RGB data and control signals into a LVDS-type. The LVDS transmitter 40 provides the LVDS receiver 32 with the LVDS-type signals. The control signals includes a vertical sync signal Vsync, a horizontal sync signal Hsync, a data enable signal DE and a clock signal CLK.

Next, the LVDS receiver 32 converts the LVDS-type signals into a TTL-type and provides the logic unit 34 with the TTL-type signals.

The gate control signal generator 34*b* and the data control signal generator 34*c*, respectively, generate gate control signals and data control signals according to the TTL-type signals and supply them to the gate and data drivers 54 and 56. In addition, the data processor 34*d* re-arranges the TTL-type RGB data and provides the re-arranged RGB data to the data driver 56.

Here, the gate control signals include a gate start pulse (GSP), a gate output enable (GOE) and a gate shift clock (GSC). The data control signals include a source output enable (SOE), a source sampling clock (SSC), a polarity reverse (POL) and a source start pulse (SSP).

The fail safe 34*a* decides whether signals from the LVDS receiver 32 are normal or abnormal and controls abnormal operations of the gate control signal generator 34*b*, the data control signal generator 34*c* and the data processor 34*d*. When abnormal signals are input, the fail safe 34*a* gets a black image displayed on the liquid crystal panel 10 of FIG. 1.

FIG. 4 is a timing chart showing input and output signals of a related art timing controller. FIG. 4 shows output gate start pulse GSP and gate shift clock GSC according to input clock signal CLK and data enable signal DE. Here, a frame frequency is fixed at 60 Hz.

In FIG. 4, signals are input and output at each of frames F1 and F2. The clock signal CLK and the data enable signal DE are input to the timing controller 30 of FIG. 2 from an external system (not shown). The gate start pulse (GSP), the gate shift clock (GSC) and other control signals (not shown) are generated according to the clock signal CLK and the data enable signal DE and are input to the gate driver 54 of FIG. 2.

There exists a vertical blanking interval VBI between first and second frames F1 and F2, that is, between after outputting data corresponding to a last gate line of the first frame F1 and before inputting data corresponding to a first gate line of the second frame F2. During the vertical blanking interval VBI, data is not applied.

As stated above, the LCD device has been used for various devices, and portable devices have limitations on using time because images are displayed within restricted power. Recently, various methods have been sought to increase the using time by reducing power consumption. As one of these methods, a method of displaying images with a low frame frequency has been proposed by decreasing the frame frequency during the vertical blanking interval VBI in case that the images are not moving pictures or moving images, for example, still images.

However, when the frame frequency is changed, flickering of the images may occur.

Table 1 shows measurements of display states when the frame frequency is changed according to the related art. Here, a setting time means a point when the frame frequency is changed, and a measuring time indicates a point when the display states are measured. At this time, a point when a frame finishes is used as a reference. Accordingly, the setting time corresponds to a period between the point when the frame frequency is changed. The measuring time corresponds to a period between the point when the previous frame finishes and the point when the display states are measured.

quency of the input signal. Therefore, the PLL 32*a* of FIG. 3 unlocks the frequency of the output signal, and a predetermined time is needed until the frequency of the output signal is fixed at the changed frequency. Accordingly, the output DE from the LVDS receiver 32 of FIG. 3 is not parallelized with the input DE to the LVDS receiver 32 of FIG. 3 and has an unknown state. Accordingly, the output DE has a glitch.

The output DE having the glitch is input to the logic unit 34 of FIG. 3, and since the control signals are generated on the basis of such an output DE, the control signals also have unknown states. Therefore, the gate control signals such as the gate start pulse GSP or the gate shift clock GSC may be unknown. This causes flickering of the images, and a black image is disposed by the fail safe 34*a* of FIG. 3.

SUMMARY

A liquid crystal display device includes a liquid crystal panel, gate and data drivers providing the liquid crystal panel with gate and data signals, and a timing controller receiving input signals that include an image signal, a sync signal, a data enable signal and a clock signal. The timing controller includes a gate control signal generator that controls the gate driver, a data control signal generator that controls the data driver, a data processor that supplies the image signal to the data driver, and a vertical enable signal generator that gener-

TABLE 1

| | interval | | | | | | | | | | | |
|---|---|---|---|---|---|---|---|---|---|---|---|---|
| | 0 | 1 | 5 | 10 | 20 | 30 | 40 | 50 | 60 | 70 | 80 | 100 |
| Setting time | 40 □s | 41□s | 45□s | 50□s | 60□s | 70□s | 80□s | 90□s | 100 □s | 110 □s | 120 □s | 140 □s |
| Measuring time | — | 68□s | 74-88 □s | 80-96 □s | 90-106 □s | 100-114 □s | 110-126 □s | 122-134 □s | 134-148 □s | 148-158 □s | 158-170 □s | 176 □s |
| Display state | — | abnormal | abnormal | abnormal | abnormal | abnormal | abnormal | abnormal | abnormal | abnormal | abnormal | abnormal |

As shown in Table 1, in the related art, when the frame frequency is changed, abnormal images are displayed.

A more detail explanations follows with reference to FIG. 5.

FIG. 5 is a timing chart showing input and output signals of a timing controller when a frame frequency is changed according to the related art. The frame frequency is changed from 60 Hz to 40 Hz. FIG. 5 shows the data enable signal output from the LVDS receiver 32 of FIG. 3, which is referred to as output DE hereinafter, and the gate control signals GSP and GSC output from the logic unit 34 of FIG. 3 according to the clock signal CLK and the data enable signal input to the LVDS receiver 32 of FIG. 3, which is referred to as input DE hereinafter.

In FIG. 5, the frame frequency can be changed during the vertical blanking interval as occasion demands, and for example, the frame frequency may be changed from 60 Hz to 40 Hz.

At this time, a frequency of the clock signal CLK is also changed, and the PLL 32*a* of FIG. 3 of the LVDS receiver 32 of FIG. 3 is unlocked. More particularly, the PLL 32*a* of FIG. 3 generates a signal that has a fixed relation to a phase of a reference signal. The PLL 32*a* of FIG. 3 compares a frequency of an output signal with a frequency of an input signal by using feedback of the output signal and locks the frequency of the output signal when the frequency of the output signal is the same as the frequency of the input signal. By the way, when the frequency of the clock signal CKL is changed, the frequency of the output signal is different from the freates a vertical enable signal according to the data enable signal and controlling the gate control signal generator and the data control signal generator.

In another aspect, a driving method of a liquid crystal display device, which includes a liquid crystal panel, gate and data drivers providing the liquid crystal panel with gate and data signals, and a timing controller receiving input signals that include an image signal, a sync signal, a data enable signal and a clock signal and controlling the gate and data drivers, includes steps of deciding first and second reference values, determining a value of a vertical enable signal by comparing a high holding time of the data enable signal and a low holding time of the data enable signal with the first and second reference values, respectively, and controlling a gate control signal generator and a data control signal generator of the timing controller according to the value of the vertical enable signal, wherein the gate control signal generator and the data control signal generator are enabled when the value of the vertical enable signal is a first level, and the gate control signal generator and the data control signal generator are disabled when the value of the vertical enable signal is a second level.

In another aspect, a timing controller used in a liquid crystal display device, which comprises a liquid crystal panel; and gate and data drivers providing the liquid crystal panel with gate and data signals; the timing controller receiving input signals that include an image signal, a sync signal, a data enable signal and a clock signal, includes a gate control signal generator controlling the gate driver, a data control signal generator controlling the data driver, a data processor supplying the image signal to the data driver, and a vertical enable signal generator generating a vertical enable signal according to the data enable signal and controlling the gate control signal generator and the data control signal generator.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to preferred embodiments of the present invention, examples of which are illustrated in the accompanying drawings.

Figure 1:
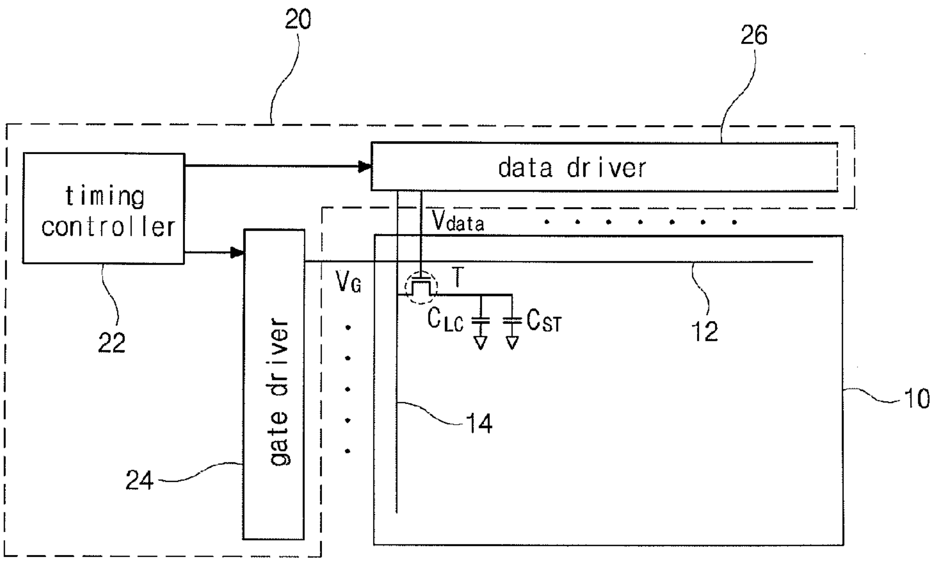
FIG. 1 RELATED ART
FIG. 1 is a view of schematically illustrating a related art LCD device.
Figure 2:
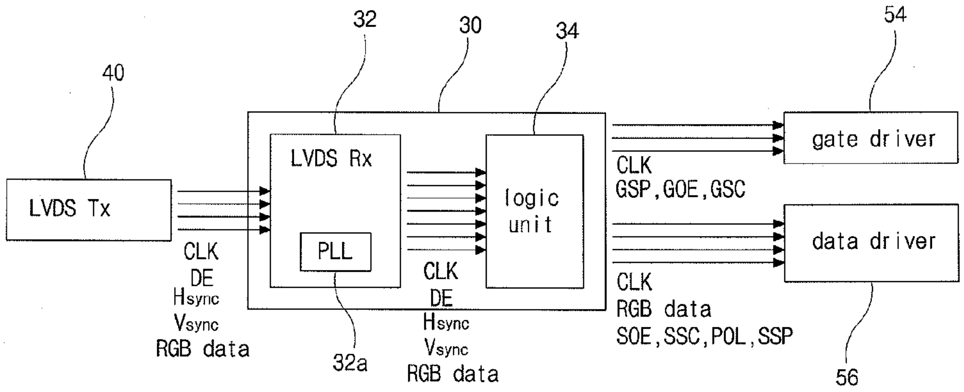
FIG. 2 RELATED ART
FIG. 2 is a view of schematically illustrating a related art timing controller.
Figure 3:
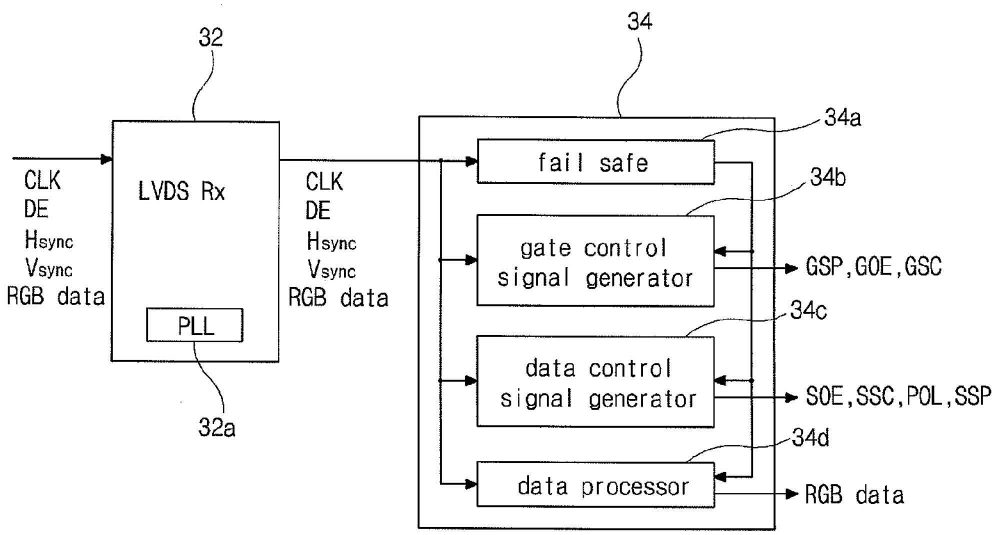
FIG. 3 RELATED ART
FIG. 3 is a view of showing a structure of the timing controller.
Figure 4:
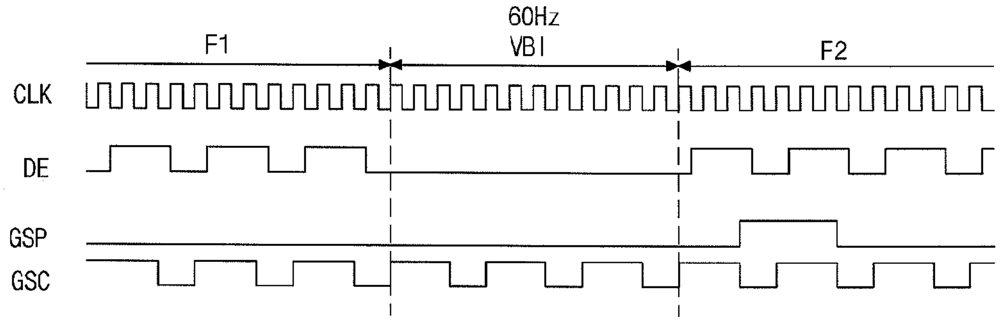
FIG. 4 RELATED ART
FIG. 4 is a timing chart showing input and output signals of a related art timing controller.
Figure 5:
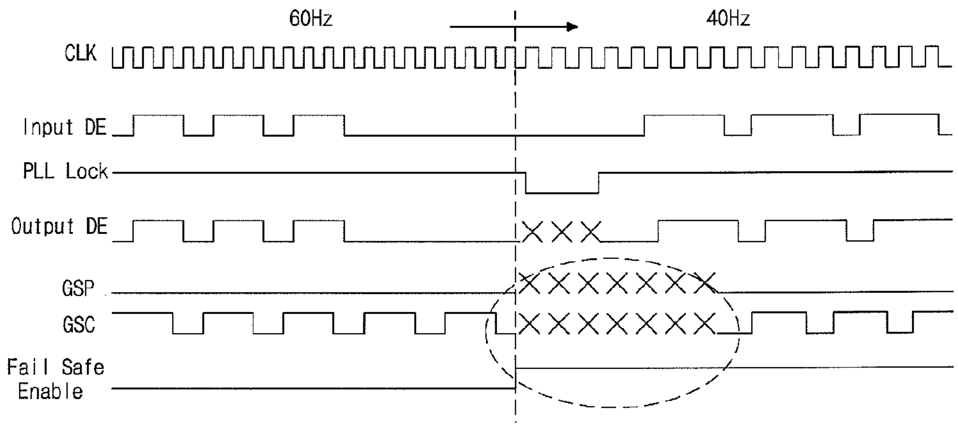
FIG. 5 RELATED ART
FIG. 5 is a timing chart showing input and output signals of a timing controller when a frame frequency is changed according to the related art.
Figure 6:
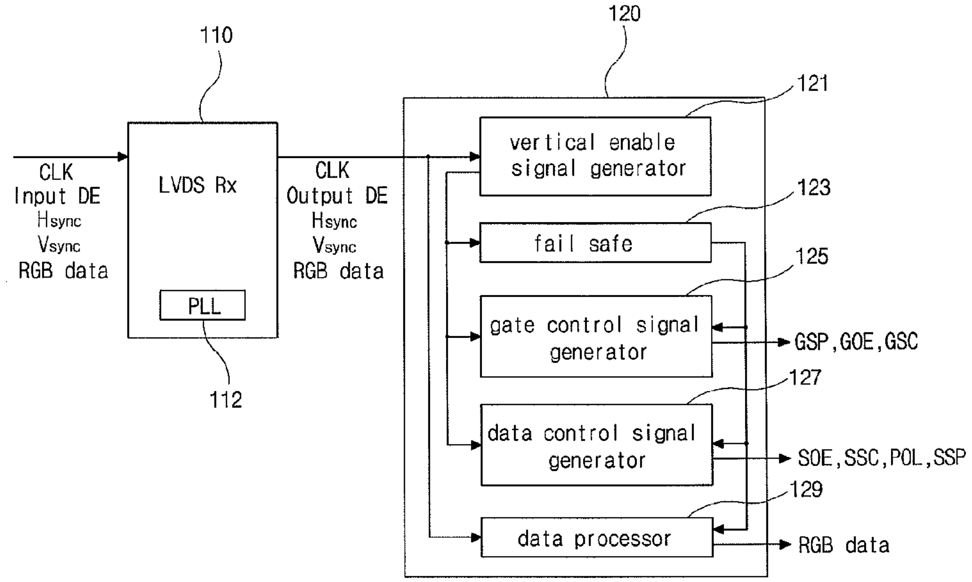
FIG. 6 is a block diagram of illustrating a timing controller according to an embodiment.

FIG. 6 is a block diagram of illustrating a timing controller according to an embodiment.

In FIG. 6, the timing controller includes a LVDS receiver (LVDS Rx) 110 and a logic unit 120.

The LVDS receiver 110 is connected to a LVDS transmitter (not shown). The LVDS receiver 110 includes a phase locked loop (PLL) 112.

Although not shown in the figure, the logic unit 120 is connected to gate and data drivers. The logic unit 120 includes a vertical enable signal generator 121, a fail safe 123, a gate control signal generator 125, a data control signal generator 127 and a data processor 129.

Here, the LVDS receiver 110 and the LVDS transmitter form an interface, and even though the LVDS receiver 110 is included in the timing controller, the LVDS receiver 110 may be excluded from the timing controller.

The LVDS transmitter converts image signals and control signals into a LVDS-type and provides the LVDS receiver 110 with the LVDS-type signals. The image signals are referred to as RGB data hereinafter. The control signals includes a vertical sync signal Vsync, a horizontal sync signal Hsync, a data enable signal DE and a clock signal CLK.

The vertical sync signal Vsync and the horizontal sync signal Hsync synchronize the RGB data. The vertical sync signal Vsync is a signal for distinguishing frames and corresponds to a time interval for one frame. The vertical sync signal Vsync is input with a period of a frame. The horizontal sync signal Hsync is a signal for distinguishing lines in a frame and corresponds to a time interval for one gate line. The horizontal sync signal is input with a period of one gate line and includes peaks corresponding to the number of gate lines in a liquid crystal panel (not shown). The data enable signal DE indicates an interval of effective data and corresponds to a time interval for supplying data signals to pixels of the liquid crystal panel. The vertical sync signal Vsync, the horizontal sync signal Hsync and the data enable signal DE are based on the clock signal CLK.

Next, the LVDS receiver 110 converts the LVDS-type signals into a TTL-type and provides the logic unit 120 with the TTL-type signals.

For convenience of explanation, the data enable signal input to the LVDS receiver 110 may be designated as input DE, and the data enable signal output from the LVDS receiver 110 may be designated as output DE.

The gate control signal generator 125 and the data control signal generator 127, respectively, generate gate control signals and data control signals according to the TTL-type signals and supply them to gate and data drivers (not shown). In addition, the data processor 129 re-arranges the TTL-type RGB data and provides the re-arranged RGB data to the data driver.

Here, the gate control signals include a gate start pulse (GSP), a gate output enable (GOE) and a gate shift clock (GSC). The data control signals include a source output enable (SOE), a source sampling clock (SSC), a polarity reverse (POL) and a source start pulse (SSP).

The fail safe 123 decides whether signals from the LVDS receiver 110 are normal or abnormal and controls abnormal operations of the gate control signal generator 125, the data control signal generator 127 and the data processor 129. When abnormal signals are input, the fail safe 123 gets a black image displayed on the liquid crystal panel. The fail safe 123 is optional and can be omitted.

The vertical enable signal generator 121 generates a vertical enable signal and controls the fail safe 123, the gate control signal generator 125 and the data control signal generator 127. When the output DE is normal, the vertical enable signal is high and thus ON, and the vertical enable signal generator 121 enables the fail safe 123, the gate control signal generator 125 and the data control signal generator 127. On the other hand, when the output DE is abnormal due to changes of the frame frequency, the vertical enable signal is low and thus OFF, and the vertical enable signal generator 121 disables the fail safe 123, the gate control signal generator 125 and the data control signal generator 127, whereby an image of a previous frame is maintained.

Figure 7:
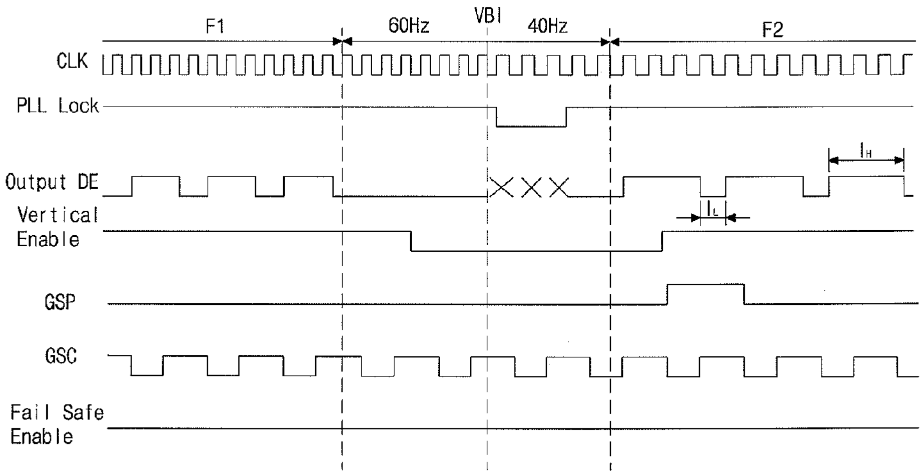
FIG. 7 is a timing chart showing input and output signals of a timing controller according to the embodiment.

FIG. 7 is a timing chart showing input and output signals of a timing controller according to the embodiment. A frame frequency is changed from 60 Hz to 40 Hz.

In FIG. 7, the frame frequency is changed during a vertical blanking interval VBI between first and second frames F1 and F2. The first frame F1 has the frame frequency of 60 Hz, and the second frame F2 has the frame frequency of 40 Hz.

A frequency of the clock signal CLK is also changed, and the PLL 112 of FIG. 6 of the LVDS receiver 110 of FIG. 6 is unlocked. Accordingly, the output DE from the LVDS receiver 110 of FIG. 6 has an unknown state, and a glitch is generated.

At this time, the vertical enable signal is low during the vertical blanking interval VBI and disables the fail safe 123, the gate control signal generator 125 and the data control signal generator 127, whereby data of the first frame F1 is maintained on the liquid crystal panel (not shown). Therefore, even though the output DE has the glitch, an image can be prevented from flickering or a black image can be prevented from being displayed.

An operation of the vertical enable signal generator will be described in more detail with reference to FIG. 8.

Figure 8:
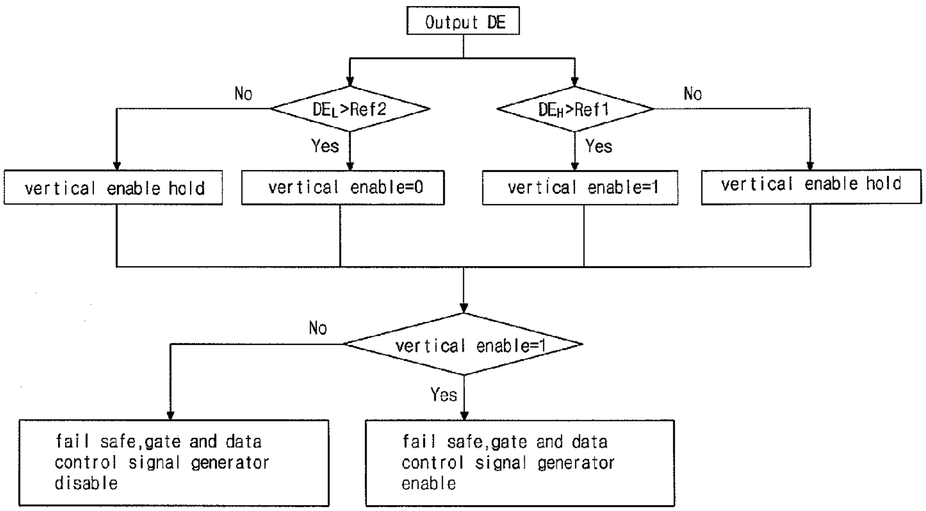
FIG. 8 is a flow chart of illustrating an operation of a vertical enable signal generator according to the embodiment.

FIG. 8 is a flow chart of illustrating an operation of a vertical enable signal generator according to the embodiment.

In FIG. 8, the data enable signal DE output from the LVDS receiver 110 of FIG. 6, which is referred to as output DE hereinafter, is input to the logic unit 120 of FIG. 6. A high holding time $DE_H$ and a low holding time $DE_L$ of the output DE are compared with first and second reference values Ref1 and Ref2, respectively. The high holding time $DE_H$ is defined as a period that the output DE is high, and the low holding time $DE_L$ is defined as a period that the output DE is low.

When the high holding time $DE_H$ of the output DE is larger than the first reference value Ref1, the output DE is normal, and the vertical enable signal becomes high, that is, "1."

TABLE 2

| | 60 Hz | 40 Hz |
|---|---|---|
| Sample 1 | 273 mA | 245 mA |
| Sample 2 | 249 mA | 221 mA |
| Sample 3 | 247 mA | 218 mA |

As shown in the table, each sample has a smaller consumed current when the frame frequency is 40 Hz than 60 Hz. Therefore, the consumed current decreases according as the frame frequency is small.

Table 3 shows measurements of display states when the frame frequency is changed according to the present invention. Here, a setting time means a point that the frame frequency is changed from the time when a frame finishes, and a measuring time indicates a point that the display states are measured from the time when the frame finishes.

TABLE 3

| | interval | | | | | | | | | | | |
|---|---|---|---|---|---|---|---|---|---|---|---|---|
| | 0 | 1 | 5 | 10 | 20 | 30 | 40 | 50 | 60 | 70 | 80 | 100 |
| Setting time | 40 □s | 41□s | 45□s | 50□s | 60□s | 70□s | 80□s | 90□s | 100 □s | 110 □s | 120 □s | 140 □s |
| Measuring time | — | 70-84 µs | 76-88 µs | 80-94 □s | 90-106 □s | 102-114 □s | 112-124 □s | 122-136 □s | 136-150 □s | 146-160 □s | 154-168 □s | 174 □s |
| Display state | — | Normal | Normal | Normal | Normal | Normal | Normal | Normal | Normal | Normal | Normal | Normal |

When the high holding time $DE_H$ of the output DE is smaller than the first reference value Ref1, the output DE is abnormal, and the vertical enable signal holds a previous value.

On the other hand, when the low holding time $DE_L$ of the output DE is larger than the second reference value Ref2, the output DE is abnormal, and the vertical enable signal becomes low, that is, "0." When the low holding time $DE_L$ of the output DE is smaller than the second reference value Ref2, the output DE is normal, and the vertical enable signal holds a previous value Next, it is determined whether the vertical enable signal is "1." When the vertical enable signal is "1," the fail safe 123 of FIG. 6, the gate control signal generator 125 of FIG. 6 and the data control signal generator 127 of FIG. 6 are enabled and normally operate. When the vertical enable signal is not '1," the fail safe 123 of FIG. 6, the gate control signal generator 125 of FIG. 6 and the data control signal generator 127 of FIG. 6 are disabled and do not generate signals influencing a displayed image. Accordingly, an image of the previous frame, i.e., the first frame F1 of FIG. 7, is displayed.

Here, the first and second reference values Ref1 and Ref2 may be based on the clock signal CLK. The first reference value Ref1, beneficially, is larger than ½ of a high interval $I_H$ of the data enable signal DE of FIG. 7 in a normal state and smaller than the high interval $I_H$ of the data enable signal DE of FIG. 7 in the normal state. Desirably, the second reference value Ref2 is larger than a low interval $I_L$ of the data enable signal DE of FIG. 7 in the normal state and smaller than the vertical blanking interval VBI between the first and second frames F1 and F2 of FIG. 7.

Table 2 shows measurements of consumed currents according to frame frequencies. In Table 2, consumed currents of each of three samples are shown when the frame frequencies are 60 Hz and 40 Hz, respectively.

As shown in Table 3, in the disclosed structure, even though the frame frequency is changed, normal images are displayed.

According to the present invention, the power consumption can be reduced by changing the frame frequency as occasion demands. Thus, the using time of the portable devices can be increased within restricted power.

Moreover, although the frame frequency is changed, flickering of the image or the black image is not displayed due to the vertical enable signal, and the data of the previous frame may be continued. Accordingly, uniform images may be displayed, and the user can use the devices without recognizing a change resulting from the changed frame frequency.

It will be apparent to those skilled in the art that various modifications and variations can be made in a liquid crystal display device and a driving method of the same of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:

a liquid crystal panel;

gate and data drivers that provide the liquid crystal panel with gate and data signals; and a timing controller that receives input signals that include an image signal, a sync signal, a data enable signal and a clock signal, the timing controller including:

a gate control signal generator that controls the gate driver;

a data control signal generator that controls the data driver;

a data processor that supplies the image signal to the data driver; and a vertical enable signal generator that generates a vertical enable signal according to the data enable signal and controls the gate control signal generator and the data control signal generator, wherein the vertical enable signal generator determines a value of the vertical enable signal by comparing lengths of a high holding time of the data enable signal and a low holding time of the data enable signal with first and second reference values, respectively.

2. The device according to claim 1, wherein when the data enable signal is normal, the vertical enable signal is high such that the gate control signal generator and the data control signal generator are enabled, and when the data enable signal is abnormal, the vertical enable signal is low such that the gate control signal generator and the data control signal generator are disabled, whereby an image of a previous frame is continuously displayed on the liquid crystal panel.

3. The device according to claim 2, wherein the vertical enable signal is high when the high holding time of the data enable signal is larger than the first reference value.

4. The device according to claim 3, wherein the vertical enable signal is low when the low holding time of the data enable signal is larger than the second reference value.

5. The device according to claim 3, wherein the first reference value is larger than ½ of a high interval of the data enable signal in a normal state and smaller than the high interval of the data enable signal in the normal state.

6. The device according to claim 4, wherein the second reference value is larger than a low interval of the data enable signal in a normal state and smaller than a vertical blanking interval between the first and second frames.

7. A driving method of a liquid crystal display device, which includes a liquid crystal panel, gate and data drivers providing the liquid crystal panel with gate and data signals, and a timing controller receiving input signals that include an image signal, a sync signal, a data enable signal and a clock signal and controlling the gate and data drivers, the method comprising:

deciding first and second reference values;

determining a value of a vertical enable signal by comparing a high holding time of the data enable signal and a low holding time of the data enable signal with the first and second reference values, respectively; and controlling a gate control signal generator and a data control signal generator of the timing controller according to the value of the vertical enable signal, wherein the gate control signal generator and the data control signal generator are enabled when the value of the vertical enable signal is a first level, and the gate control signal generator and the data control signal generator are disabled when the value of the vertical enable signal is a second level.

8. The method according to claim 7, wherein determining the value of the vertical enable signal includes:

choosing the first level for the value of the vertical enable signal when a high holding time of the data enable signal is larger than the first reference value and holding the value of the vertical enable signal when the high holding time of the data enable signal is smaller than the first reference value; and choosing the second level for the value of the vertical enable signal when a low holding time of the data enable signal is larger than the second reference value and holding the value of the vertical enable signal when the low holding time of the data enable signal is smaller than the second reference value.

9. The method according to claim 7, wherein the first reference value is larger than ½ of a high interval of the data enable signal in a normal state and smaller than the high interval of the data enable signal in the normal state.

10. The method according to claim 7, wherein the second reference value is larger than a low interval of the data enable signal in a normal state and smaller than a vertical blanking interval between adjacent frames.

11. A timing controller used in a liquid crystal display device, which comprises: a liquid crystal panel; and gate and data drivers providing the liquid crystal panel with gate and data signals; the timing controller receiving input signals that include an image signal, a sync signal, a data enable signal and a clock signal, the timing controller including:

a gate control signal generator that controls the gate driver;

a data control signal generator that controls the data driver;

a data processor that supplies the image signal to the data driver; and a vertical enable signal generator that generates a vertical enable signal according to the data enable signal and controls the gate control signal generator and the data control signal generator, wherein the vertical enable signal generator determines a value of the vertical enable signal by comparing lengths of a high holding time of the data enable signal and a low holding time of the data enable signal with first and second reference values, respectively.

12. The device according to claim 2, wherein the vertical enable signal is low when the low holding time of the data enable signal is larger than the second reference value.

13. The device according to claim 12, wherein the second reference value is larger than a low interval of the data enable signal in a normal state and smaller than a vertical blanking interval between the first and second frames.

* * * * *